United States Patent
Yano et al.

(10) Patent No.: US 6,893,114 B2
(45) Date of Patent: May 17, 2005

(54) INK JET PRINTING APPARATUS, IMAGE PROCESSING METHOD AND CONTROL PROGRAM

(75) Inventors: Kentaro Yano, Kanagawa (JP); Masao Kato, Kanagawa (JP); Mitsuhiro Ono, Tokyo (JP); Fumitaka Goto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 10/609,484

(22) Filed: Jul. 1, 2003

(65) Prior Publication Data

US 2004/0061760 A1 Apr. 1, 2004

(30) Foreign Application Priority Data

Jul. 3, 2002 (JP) ......................................... 2002-195081
Jun. 24, 2003 (JP) ......................................... 2003-180182

(51) Int. Cl.[7] ................................................. B41J 2/21
(52) U.S. Cl. ........................................................ 347/43
(58) Field of Search ............................. 347/43, 15, 95, 347/100, 20, 21; 358/3.03, 3.04

(56) References Cited

U.S. PATENT DOCUMENTS

| | | | |
|---|---|---|---|
| 4,330,787 A | 5/1982 | Sato et al. | 346/140 R |
| 4,459,600 A | 7/1984 | Sato et al. | 346/140 R |
| 4,694,302 A | 9/1987 | Hackleman et al. | 346/1.1 |
| 4,723,129 A | 2/1988 | Endo et al. | 346/1.1 |
| 4,740,796 A | 4/1988 | Endo et al. | 346/1.1 |
| 4,849,774 A | 7/1989 | Endo et al. | 346/140 R |
| 5,122,814 A | 6/1992 | Endo et al. | 346/33 R |
| 5,159,349 A | 10/1992 | Endo et al. | 346/33 A |
| 5,521,621 A | 5/1996 | Endo et al. | 347/15 |
| 5,618,338 A | 4/1997 | Kurabayashi et al. | 106/26 R |
| 5,640,187 A | 6/1997 | Kashiwazaki et al. | 347/101 |
| 5,754,194 A | 5/1998 | Endo et al. | 347/15 |
| 5,854,642 A | * 12/1998 | Takahashi et al. | 347/40 |
| 6,074,052 A | 6/2000 | Inui et al. | 347/101 |
| 6,123,411 A | 9/2000 | Inui et al. | 347/43 |
| 6,158,834 A | * 12/2000 | Kato et al. | 347/9 |
| 6,334,666 B1 | 1/2002 | Inui et al. | 347/43 |
| 6,460,989 B1 | 10/2002 | Yano et al. | 347/101 |
| 6,517,199 B1 | 2/2003 | Tomioka et al. | 347/101 |
| 6,536,890 B1 | 3/2003 | Kato et al. | 347/100 |

FOREIGN PATENT DOCUMENTS

| | | |
|---|---|---|
| GB | 1595122 | 3/1978 |
| JP | 55-150396 A | 1/1980 |

(Continued)

OTHER PUBLICATIONS

Nikkei Electronics, No. 185, pp. 50–65 (May 1, 1978).

*Primary Examiner*—Thinh Nguyen
(74) *Attorney, Agent, or Firm*—Fitzpatrick, Cella, Harper & Scinto (57) ABSTRACT

Image data, or RGB luminance data input from a host computer, is color-converted by LUT into 8-bit CMYK density data for each ink color. The CMYK density data is divided into predetermined regions and, based on a gray scale value for each of the divided regions, ink application volumes are calculated. According to the calculated ink application volumes, the 8-bit processing liquid application data S is generated. Then, the CMYK density data and the processing liquid application data undergo output gamma processing, after which they are quantized by a quantization processing unit into 1-bit ejection data for each nozzle.

10 Claims, 5 Drawing Sheets

FOREIGN PATENT DOCUMENTS

| | | |
|---|---|---|
| JP | 55-65269 A | 5/1980 |
| JP | 55-66976 A | 5/1980 |
| JP | 58-16180 B2 | 3/1983 |
| JP | 61-59911 B2 | 12/1986 |
| JP | 61-59912 B2 | 12/1986 |
| JP | 61-59914 B2 | 12/1986 |
| JP | 63-22681 A | 1/1988 |
| JP | 63-60783 A | 3/1988 |
| JP | 63-299971 A | 12/1988 |
| JP | 64-9279 A | 1/1989 |
| JP | 64-63185 A2 | 3/1989 |
| JP | 4-259590 A | 9/1992 |
| JP | 6-92010 A | 4/1994 |
| JP | 8-72393 A | 3/1996 |
| JP | 8-216386 A | 8/1996 |
| JP | 8-224955 A | 9/1996 |
| JP | 8-281974 A | 10/1996 |

\* cited by examiner

INK JET PRINTING APPARATUS, IMAGE PROCESSING METHOD AND CONTROL PROGRAM

This application claims priority from Japanese Patent Application Nos. 2002-195081 filed Jul. 3, 2002 and 2003-180182 filed Jun. 24, 2003, which are incorporated hereinto by reference.

BACKGROUND OF THE INVENTION

1. Field of the Invention

The present invention relates to an ink jet printing apparatus that imparts to a print medium a liquid compound in addition to inks to produce a color image with excellent color reproduction and excellent uniformity of color. The present invention also relates to an image processing method for the ink jet printing apparatus and a control program for executing the image processing method.

2. Description of the Related Art

An ink jet printing apparatus ejects ink droplets onto a print medium such as print paper to form an image. With an ink jet printing apparatus of a type that uses an electrothermal transducer as an ejection energy supply means and imparts thermal energy to ink to generate a bubble in the ink and eject an ink droplet by a bubble-generated pressure, as disclosed in Japanese Patent Application Publication Nos. 61-59911 (1986), 61-59912 (1986) and 61-59914 (1986), it is possible to realize a high-density multi-orifice print head easily which can produce a high-quality, high-resolution image at high speed.

Because of its advantages, such as relative ease with which to form a color image, and to form an ink jet printing apparatus by a relatively low cost and a small size, the ink jet printing apparatus is rapidly gaining popularity.

With a widespread use of the ink jet printing apparatus in recent years, there is a growing demand on the ink jet printing apparatus for as high an image quality as a silver salt picture. This in turn has resulted in growing technical demands for an enhanced color density, a wider color reproduction range and a color uniformity of an ink jet-printed image.

Under these circumstances, a variety of proposals have been made so far to realize a stabilized ink jet printing and an improved quality of images printed by the ink jet printing. One such proposal for a print medium involves applying a filler material and a size agent to the surface of base paper of a print medium. For example, a technique is disclosed which coats the base paper with porous microparticles as a filler material that adsorbs a colorant, to form an ink receiving layer of the porous microparticles. As print media using this technology, ink jet coated paper is on the market.

In addition to special processing performed on a print medium, various kinds of treatments have also been proposed for inks applied to the print medium to secure a stable, high-quality printed result. Some representative proposals will be described in the following.

A first such proposal is to incorporate in ink a volatile solvent and a penetrating solvent. For example, as described in Japanese Patent Application Laid-open No. 55-65269 (1980), a chemical agent such as surfactant that enhances a penetrating performance is incorporated in ink to quicken the fixing of the ink onto a print medium. Further, Japanese Patent Application Laid-open No. 55-66976 (1980) discloses a method which uses an ink made up mainly of a volatile solvent to quicken the fixing of ink.

A second proposed method involves applying a liquid compound called a processing liquid in addition to the ink onto a print medium so that the ink and the liquid compound mix and react with each other on the print medium. The liquid compound, when it reacts with the ink, produces a variety of effects, such as improving an image density and a water resistance and suppressing bleeding. Either before or after the ink is applied to the print medium, the liquid compound is ejected onto ink landing positions to mix and react with the ink on the print medium, producing the above-mentioned effects to form a good printed image.

Japanese Patent Application Laid-open No. 63-60783 (1988), for example, discloses a method which applies a liquid compound containing a basic polymer to a print medium and then ejects ink containing anionic dye to form an image. Japanese Patent Application Laid-open No. 63-22681 (1988) describes a printing method which mixes on a print medium a first liquid compound containing a reactive chemical species and a second liquid compound containing a chemical agent that reacts with the reactive chemical species. Further, Japanese Patent Application Laid-open No. 63-299971 (1988) describes a method which first applies to a print medium a liquid compound containing an organic chemical compound having two or more cationic groups for each molecule and then ejects inks containing an anionic dye to form an image. Further, Japanese Patent Application Laid-open No. 64-9279 (1989) describes a method that applies to a print medium an acidic liquid compound containing succinic acid and the like followed by inks containing anionic dye to form an image.

Japanese Patent Application Laid-open No. 64-63185 (1989) discloses a method that applies a liquid compound, which renders a dye insoluble, to paper before ejecting ink droplets. Japanese Patent Application Laid-open No. 8-224955 (1996) discloses a method that uses a liquid compound containing cationic substances with different molecular weight distribution areas, along with inks containing an anionic chemical compound. Japanese Patent Application Laid-open No. 8-72393 (1996) describes a method that uses a liquid compound containing a cationic substance and powdered cellulose along with inks. These methods produce a high image density, a good printed quality and a good water resistance. It is also described in these publications that printed images thus produced have good characteristics in terms of color reproduction and bleeding. Further, Japanese Patent Application Laid-Open No. 55-150396 (1981) proposes forming an image on a print medium with a dye ink and then applying an insolubilizer that reacts with the dye to form a lake.

A third method involves mixing inks with a microparticle-containing liquid compound on a print medium.

Japanese Patent Application Laid-open No. 4-259590 (1992) discloses a method which first applies to a print medium a colorless liquid containing colorless inorganic microparticles and then ejects non-aqueous recording liquid. Japanese Patent Application Laid-open No. 6-92010 (1994) discloses a method that first applies to a print medium a solution containing microparticles or a solution containing microparticles and binder polymer and then ejects inks containing a pigment, a water-soluble resin, a water-soluble solvent and water. These methods are described to be able to produce images with good printed quality and color characteristics irrespective of a kind of paper. The method of applying a processing liquid is effectively used also for print media that are not given a special treatment on the surface, such as plain paper, in that it can enhance the image quality.

In the method of applying a processing liquid as well as inks to a print medium, it is necessary to generate an ejection signal for the processing liquid in addition to an ink ejection signal. Generally, a host computer sends image data to a printing apparatus where it is processed to generate only ejection information for each ink. Thus, the processing liquid ejection signal is separately generated by performing logic operations on the ink ejection information in the printing apparatus, as disclosed in Japanese Patent Application Laid-open Nos. 08-216386 (1996) and 08-281974 (1996).

For example, image data that is received in the form of 8-bit data (256 gray levels) for each of RGB colors is converted by a three-dimensional lookup table (LUT) into CMY data. The CMY data is further subjected to gamma processing to be transformed into 8-bit data for each of CMYK colors. The CMYK 8-bit data is further converted by binarization processing into binary data, or ejection data for each of CMYK ink colors. Based on the binary ejection data, the processing liquid ejection data S is determined from logic operations.

After having investigated a variety of ink jet printing techniques including those described above, the inventors of this invention have found that although these techniques produce satisfactory results in terms of the respective technical problems, they often degrade other ink jet printing characteristics.

For example, a print medium that is coated on its base paper surface with a filler and sizing agent (simply referred to as coated paper) is recognized as a technology that enables a formation of high quality images.

Generally, to produce an image with high color saturation, it is known that a colorant must remain on the surface of a print medium in a single-molecular state without being aggregated. Porous microparticles in the coated paper have a function of fixing a colorant in the single-molecular state. However, to obtain a high image density and high color saturation, it is essential to form a thick ink reception layer made up of a large amount of porous microparticles which covers the base paper to hide it from the colorant in the ink applied to the print medium. This gives rise to a problem that the texture of the base paper is lost. One of possible reasons that an ink reception layer so thick as will lose the texture of the base paper needs to be formed is that the colorant may not adsorb to the porous microparticles efficiently.

Figure 5:
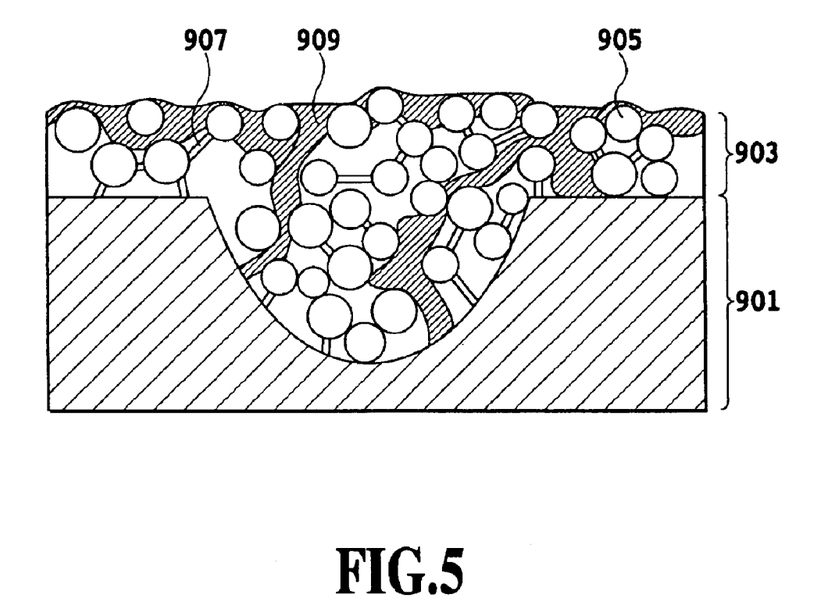
FIG. 5 is a schematic diagram showing a cross section near a surface of coated paper.

In the explanation that follows, coated paper with one ink reception layer is contemplated. FIG. 5 is a cross section schematically showing a surface of the coated paper and its surrounding. In the figure, denoted 901 is base paper and 903 an ink reception layer. The ink reception layer 903 has porous microparticles 905 and an adhesive 907 that binds them together. When an ink is applied to the coated paper, the ink penetrates into voids between the porous microparticles 905 by capillary attraction to form ink penetration portions 909. As shown in the figure, since the porous microparticles in the ink reception layer varies in density depending on locations, the way the ink penetrates by the capillary attraction differs from one location to another. Thus, during the process of ink penetration, the colorant cannot contact the surfaces of the porous microparticles uniformly, failing to adsorb to the porous microparticles efficiently.

Further, there are portions in which the adhesive 907 impedes ink penetration, preventing the ink from penetrating into the ink reception layer 903. These portions thus cannot contribute to an improvement of color saturation. From the reasons described above, the conventional coated paper cannot adsorb a colorant in a single-molecular state as efficiently as it should, considering the volume of porous microparticles. As a result, to obtain a high quality image a large volume of porous microparticles is needed, which in turn impairs the texture of the base paper.

Further, although the technique cited as the first method, which mixes a volatile solvent in inks, can improve the fixing of the inks to a print medium, there have been cases where an image density deteriorates or a color reproduction range, considered important in the printing on plain paper or in the color image printing, decreases. Further, with the technique cited as the second method, which applies a liquid compound to inks on a print medium, since the colorant in the inks can be left on the surface of the print medium, a print with a high image density can be obtained. However, there are cases where the color reproduction range and color saturation level obtained are not satisfactory probably due to the colorant aggregating on the surface of the print medium. Further, with the technique cited as the third method, which mixes inks with a microparticle-containing liquid compound on a print medium, although the condition of the surface of the print medium can be improved by the application of the microparticle-containing solution, it is not possible to produce so vivid an image as can be realized with coated paper. As for non-aqueous inks, there are limitations imposed on the selection of colorants and the way the colorants are applied.

In the embodiment of the present invention described in the following, a liquid compound will be shown which can eliminate the above-described problems experienced with the conventional liquid compounds. However, the following problems still exist with the application of liquid compounds including the conventional liquid compounds.

In the method that applies a liquid compound (also referred to as a "processing liquid") as well as inks, there are limitations on the amount of inks and processing liquid that can be applied to a print medium. This narrows a degree of freedom of image reproduction. Generally, ink is composed of about 95% solvent by weight. That is, a colorant, such as dye and pigment, occupies only 5% of droplets ejected. To send the ejected droplets flying stably, a large volume of solvent as a carrier needs to be ejected at the same time and, after the ink droplets land on the print medium, the carrier is required to be fixed quickly. However, since there is a limit on the amount of liquid that the print medium can absorb, if an ink volume in excess of the ink accommodation capacity of the print medium is applied, the ink will flow or bleed. For this reason, there is a limit on the volume of ink that can be applied to the print medium and this constitutes an obstacle in the way of enhancing an image quality. Where a processing liquid is applied, a solvent for the processing liquid needs also to be applied in addition to the solvent for the inks and therefore the applicable volume of inks is more limited than when only the inks and their solvent are used. The limitation on the applicable volume also leads to a problem of reduced degree of freedom in the image processing for generating ejection data, i.e., a problem that the image processing must consider the ink and processing liquid application volumes.

Ejection data of a processing liquid has conventionally been generated by performing the color conversion processing on received RGB image data to form ejection data for each ink color and performing logic operations on the ink ejection data, as described above. During this process, considering the limitation on the application volumes in generating the processing liquid ejection data will make the calculation volume prohibitively huge.

That is, in a pseudo-gray scale representation based on ejection/non-ejection of ink dots, a color or density is represented not for each pixel, a unit for data processing, but for a unit area of a certain expanse made up of a plurality of pixels. Thus, a frequency of ejection of each ink is also determined for each unit area and, in generating the ink and processing liquid ejection data that considers the application volume limitations, it is necessary to take into account the ink ejection data in this entire unit area. This in turn requires a relatively large volume of processing calculations to generate the processing liquid ejection data.

With an improvement of image quality in recent years, a variety of printing methods are coming into use making the printing operation complicated. They include, for example, a dark-light ink printing using low-density photo inks (PC, PM) in addition to ordinary CMYK inks, an ejection volume modulation printing that changes an ink ejection volume to improve a granularity, and a combination of these. A dark ink and a light ink have different amounts of colorant in a single droplet. Hence, with these printing methods, the required processing liquid application volume varies depending on the kind of the printed dot. In this condition, these known methods for generating the processing liquid ejection data are required to perform different processing for each print data with a different ink kind and a different ejection volume, making the system complex and increasing the manufacturing cost.

The present invention has been accomplished to overcome the problems experienced with the conventional methods. This invention provides an image processing method which, even in an ink jet printing method that applies a liquid compound for improving the fixing of inks to a print medium in addition to the inks, can generate liquid compound ejection data considering limitations on ink application volumes, without increasing a processing load. This invention also provides an ink jet printing apparatus using the image processing method, and also a control program that executes the same method.

SUMMARY OF THE INVENTION

According to one aspect, the present invention provides an ink jet printing apparatus which uses a print head for ejecting a plurality of color inks and a print head for ejecting a processing liquid contributing to fixing the inks on a print medium to apply the inks and the processing liquid to the print medium to form an image, the ink jet printing apparatus comprising: a color conversion processing means for generating multivalued data for each of the color inks and multivalued data for the processing liquid based on multivalued image data corresponding to an image to multivalued image data corresponding to an image to be printed; and a quantization processing means for converting the multivalued data for each of the color ink and the multivalued data for the processing liquid generated by the color conversion processing means into quantized data for each of the color inks and quantized data for the processing liquid.

According to another aspect, the present invention provides an image processing method for processing data used in an ink jet printing apparatus, wherein the ink jet printing apparatus uses a print head for ejecting a plurality of color inks and a print head for ejecting a processing liquid contributing to fixing the inks on a print medium to apply the inks and the processing liquid to the print medium to form an image, the image processing method comprising: a color conversion process for generating multivalued data for each of the color inks and multivalued data for the processing liquid based on multivalued image data corresponding to an image to be printed; and a quantization process for converting the multivalued data for each of the color ink and the multivalued data for the processing liquid generated by the color conversion process into quantized data for each of the color inks and quantized data for the processing liquid.

According to a further aspect, the present invention provides a control program for processing data used in an ink jet printing apparatus, wherein the ink jet printing apparatus uses a print head for ejecting a plurality of color inks and a print head for ejecting a processing liquid contributing to fixing the inks on a print medium to apply the inks and the processing liquid to the print medium to form an image, the control program comprising: a process for generating multivalued data for each of the color inks and multivalued data for the processing liquid based on multivalued image data corresponding to an image to be printed; and a process for converting the multivalued data for each of the color ink and the multivalued data for the processing liquid generated by the color conversion process into quantized data for each of the color inks and quantized data for the processing liquid; wherein these process are executed by a computer.

With these configurations, since the processing liquid application data and the density data for each ink color are determined based on image data to be printed, an appropriate processing liquid application volume can be determined without imposing any limitations on the image processing, thus providing a printed result with a satisfactory image quality and a high ink fixing performance. That is, in high gray level regions, as in solid printed regions, since the water accommodation capacity of a print medium is almost filled by ink alone, the processing liquid application volume is reduced without reducing the ink application volume, to satisfy the limit on the print medium water accommodation capacity. In low and medium gray level regions, the processing liquid application volume is increased to increase a probability of the processing liquid contacting sparsely distributed ink dots and thereby enhance the ink fixing performance.

In this specification, the "reaction between colorant and microparticles" refers not only to a covalent bonding between them but also to their ionic bonding, physical and chemical adsorption, absorption, adhesion and other mutual actions.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

One embodiment of the present invention will be described by referring to the accompanying drawings.

Figure 1:
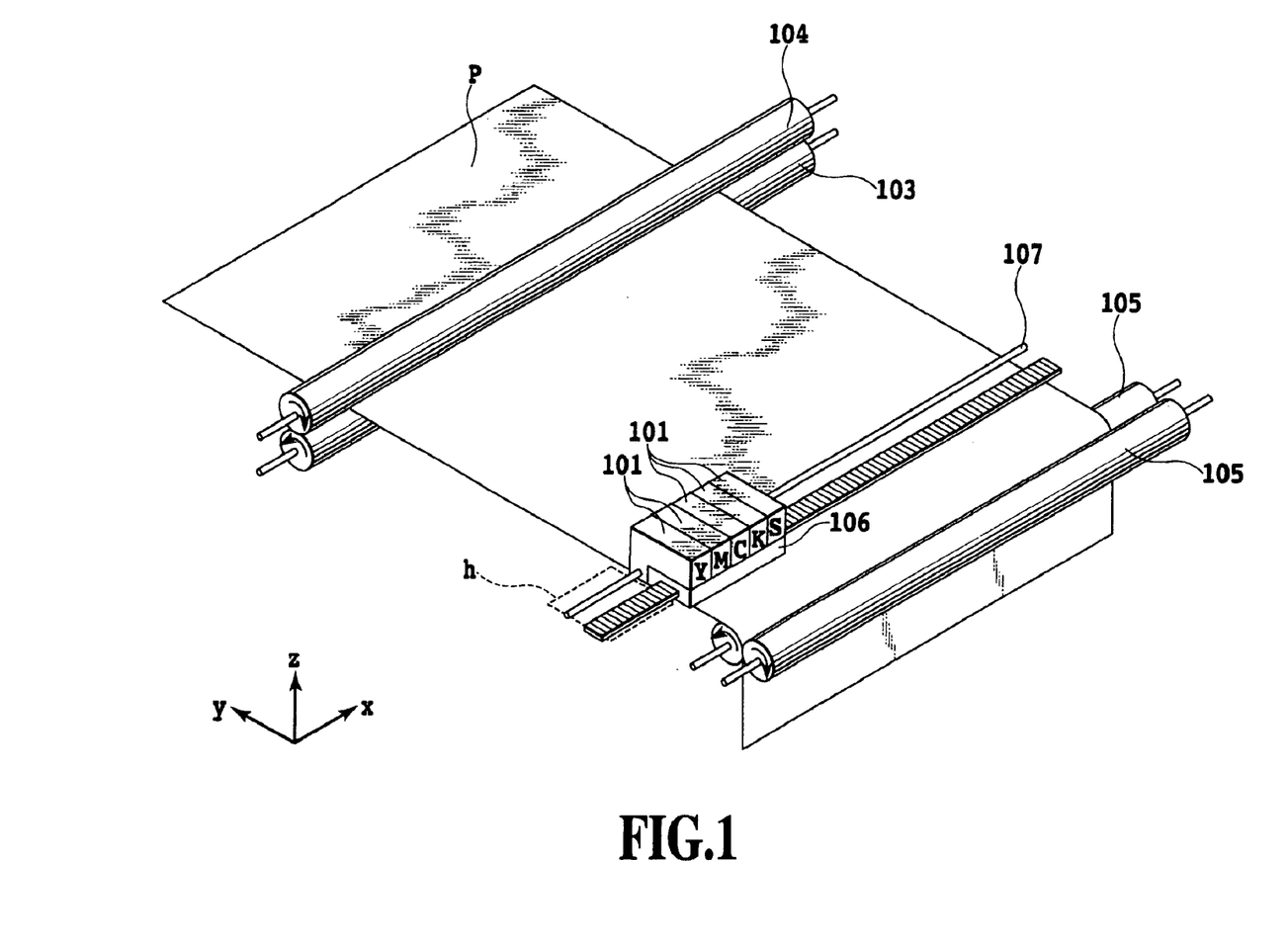
FIG. 1 is a schematic diagram showing an ink jet printing apparatus as one embodiment of the present invention.

FIG. 1 is a schematic diagram showing an ink jet printing apparatus of this embodiment.

A print head 102 integrally formed with an ink tank 101 is mounted on a carriage 106 so that it can be moved in a direction of arrow x along a guide rail 107. A print medium is fed in a direction of arrow y to a position where it faces the print head 102. As the carriage 106 moves in the direction of arrow x, the print head 102 ejects ink to print on the print medium P. When the carriage 106 reaches one end of the print medium P, a transport roller 104 feeds the print medium P a predetermined distance in the direction of arrow y. By alternately repeating the printing by the print head and the paper feeding by the transport roller 104, an image is formed over an entire area of the print medium P.

The ink tank 101 and the print head 102 are divided into five ink tanks and five print heads, respectively, for yellow (Y), magenta (M), cyan (C) and black (K) and for an ink processing liquid (S). A light-colored ink head may also be provided.

The print head 102 has a plurality of nozzles arrayed in the direction of arrow y for each ink color. Each nozzle is provided with a heater, which is energized to generate a bubble in ink near the nozzle to eject a predetermined volume of ink by a bubble-generated pressure. While this embodiment employs a bubble jet system (registered tradename), the present invention is not limited to this system but other ink ejection system can also be used.

Moving parts, such as carriage 106, feed roller 105 and transport roller 104, are driven by drive motors individually provided to these parts. These drive motors are controlled by a control unit incorporating a CPU.

Next, a flow of data in the ink jet printing apparatus of this embodiment will be explained.

The ink jet printing apparatus is connected to a host, such as a personal computer, and receives image data generated by the host. The control unit transforms the image data being composed of RGB luminance signals into density data for each ink color and further into a drive signal for each nozzle. Based on this drive signal, the associated drive parts are driven to execute the printing operation. The processing for transforming the luminance signal into density data will be described later in detail.

Next, in the process of printing on a print medium, a method of applying an ink processing liquid will be explained. A preferred embodiment has (i) a process of applying inks containing colorants to a print medium and (ii) a process of applying a liquid compound or ink processing liquid to a print medium and is arranged to ensure that the ink and the liquid compound are brought into contact in a liquid state. With such an arrangement taken, it is possible to stably produce an ink jet printed image or ink jet print that has a wider range of color reproduction, excellent bleed suppression capability and color uniformity, little density variation appearing as lines in solid printed portions and a good rubbing resistance.

Further, a method of generating ink processing liquid application data described later makes it possible to stably produce an ink jet print that has a wider color reproduction range, excellent bleed suppression capability and color uniformity, little density variation appearing as lines in solid printed portions and a good rubbing resistance.

First, in this embodiment, a mechanism in which the ink processing liquid and the ink are fixed in a print medium will be explained with reference to FIG. 2 and FIG. 3. The following explanation concerns a case where a water-based ink containing a water-soluble dye (anionic dye) with an anionic group is used as an ink and a water-based liquid compound containing disperse microparticles charged on their surfaces with cations is used as the liquid compound.

Before we proceed, let us first define a term. In this invention, a phrase "single-molecular state" refers to a state where a colorant such as dye and pigment is kept dissolved or dispersed in ink. If the colorant agglomerates to an extent that does not degrade a color saturation, this state is taken to be included in the "single-molecular state." For example, since it is considered preferable that a dye be in the single-molecule state, colorants other than dyes shall also be deemed as being in the "single-molecule state" for convenience.

Figure 2:
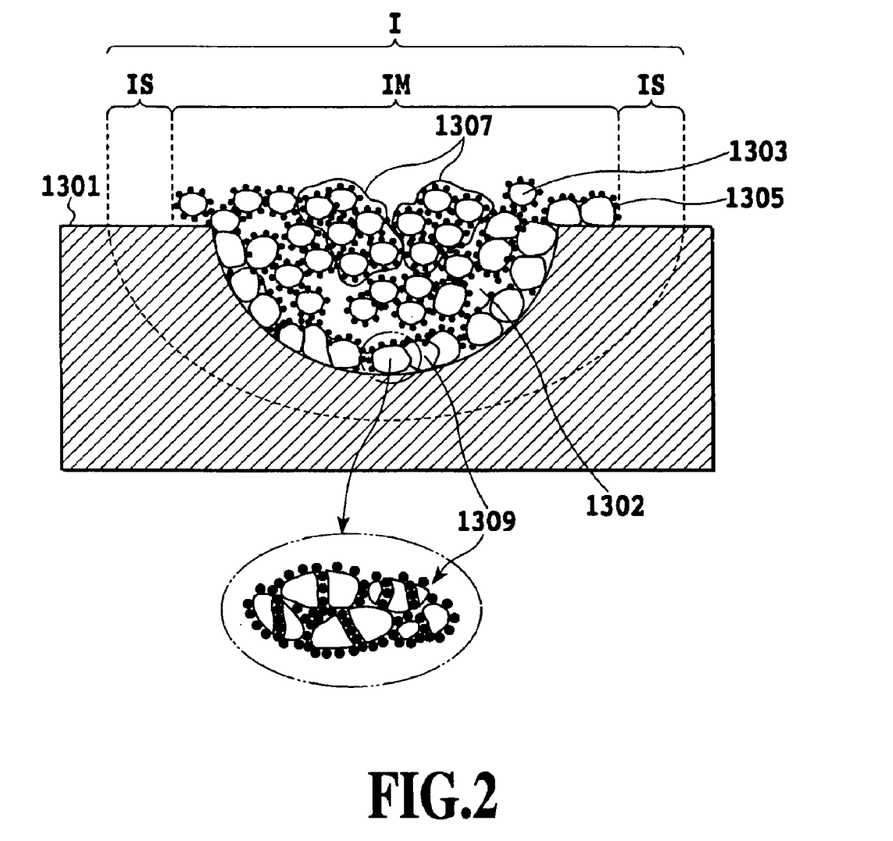
FIG. 2 is a schematic cross-sectional view of a print medium applied with ink droplets.

FIG. 2 is a schematic cross-sectional view of a print medium applied with ink, showing that a colored portion I is made up of a main image portion IM and its peripheral portions IS. In FIG. 2, reference number 1301 denotes a print medium and 1302 represents voids present between fibers of the print medium. Denoted 1303 are schematically depicted microparticles that chemically adsorb a colorant 1305. As shown in FIG. 2, the main image portion IM comprises microparticles 1303 having a colorant 1305 adsorbed to the surfaces thereof in a single-molecular or near single-molecular state (simply referred to as a single-molecular state) and aggregates 1307 of the microparticles holding the colorant in the single-molecular state. Reference number 1309 indicates an aggregate of microparticles present near fibers of the print medium within the main image portion IM. The main image portion IM is formed by a process of the microparticles 1303 physically or chemically adsorbing to the print medium fibers and by a process of the colorant 1305 and the microparticles 1303 adsorbing to each other in a liquid-liquid phase. Therefore, a color saturation characteristic of the colorant itself is hardly degraded and, even with print media such as plain paper in which ink easily soaks, the image density and color saturation remain high, allowing for the formation of an image with as wide a color reproduction range as found in coated paper.

The colorant 1305 that failed to adsorb to the surfaces of the microparticles 1303 and remains in ink, on the other hand, soaks in the print medium 1301 in a horizontal direction and in a depth direction, forming minute bleeds in the peripheral portions IS. Because the colorant remains near the surface of the print medium 1301 and minute ink bleeds are formed in the peripheral portions, even shadow portions and solid-printed portions that are applied with greater volumes of ink than in other areas have an excellent color uniformity with little foggy appearance or color variation. As shown in FIG. 2, if the print medium 1301 has some penetrability for inks and liquid compounds, this embodiment cannot necessarily prevent the penetration of the ink components and liquid compound components into the interior of the print medium and allows a certain degree of penetration.

Further, in a case where the liquid compound of the present invention is used, as the microparticles present near the surface of the print medium agglomerate into aggregates

1309, small voids are formed between the aggregates. As the colorant 1305 present in the ink penetrates into the interior of the print medium, it moves into the small voids between the microparticle aggregates 1309, adsorbing to and around entrances of the voids and to their inner walls in an ideal single-molecular state. As a result, an increased volume of colorant remains near the surface of the print medium. This can provide a print with a further enhanced color saturation.

In one embodiment of a method of forming a colored portion in a print medium according to the present invention, FIGS. 3A–3D are schematic cross-sectional views of a colored portion 1400 and an outline process showing how the colored portion is formed. In these figures, reference number 1401 designates a reaction product formed by the reaction between an ink and a liquid compound, a portion that includes mainly a reaction product between a colorant and microparticles (simply referred to as a "reaction portion") and corresponds to the main image portion IM of FIG. 2. Denoted 1402 are portions that are formed by the ink virtually not involved in the reaction with the liquid compound flowing out to the peripheries of the reaction portion 1401 (simply referred to as an "outflowing ink receiving portion") and which correspond to the peripheral portions IS of FIG. 2. Such a colored portion 1400 is formed as follows in one example. What is shown as 1405 in these figures is schematically depicted voids formed between fibers of the print medium.

Figure 3A:
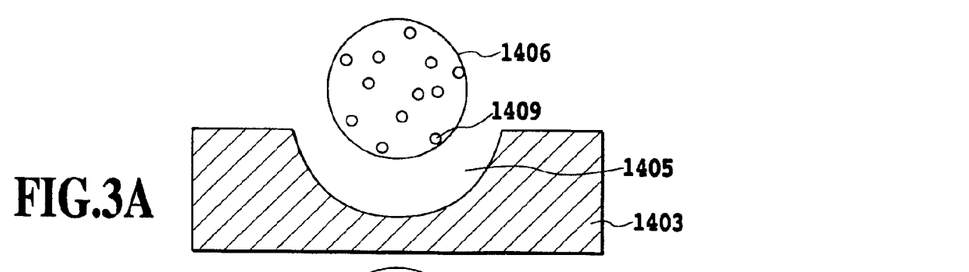
FIG. 3A is a schematic cross-sectional view of a print medium applied with ink droplets and a print performance enhancement liquid.
Figure 3B:
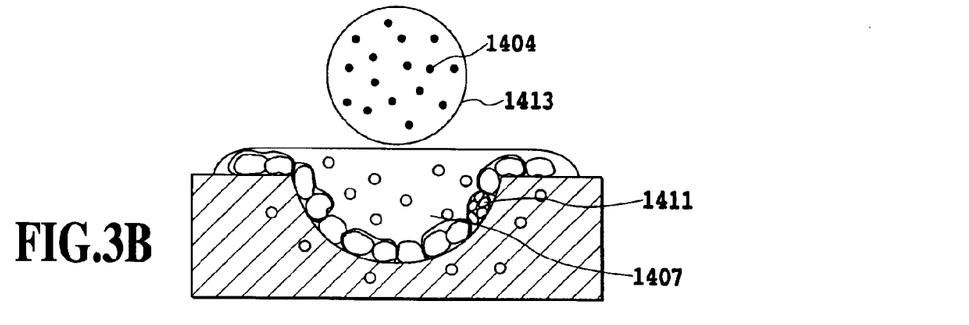
FIG. 3B is a schematic cross-sectional view of a print medium applied with ink droplets and a print performance enhancement liquid.

First, a colorant 1404 and a liquid compound 1406 reactive with the colorant 1404 are applied in the form of droplets to a print medium 1403 (FIG. 3A). As a result, a pool 1407 of the liquid compound is formed (FIG. 3B). Microparticles 1409 in the liquid pool 1407 near the surfaces of fibers of the print medium physically or chemically adsorb to the surfaces of the print medium fibers.

At this time, a state of dispersion of the microparticles becomes unstable, causing some of the microparticles bind together to form aggregates 1411. At portions in the liquid pool 1407 remote from the fibers, the microparticles 1409 are considered to remain dispersed.

Figure 3C:
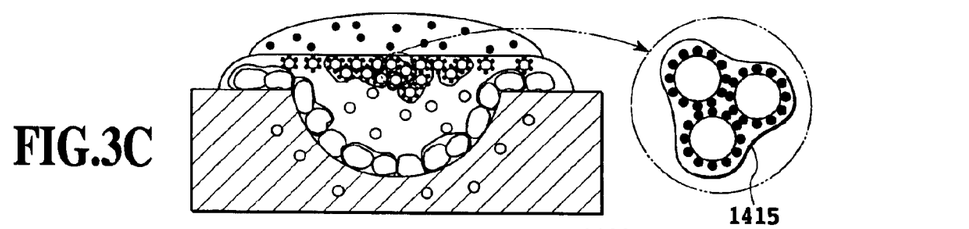
FIG. 3C is a schematic cross-sectional view of a print medium applied with ink droplets and a print performance enhancement liquid.

Next, an ink 1413 is applied in the form of drop-lets to the print medium 1403 (FIG. 3B). As a result, at an interface between the ink 1413 and the liquid pool 1407, the colorant 1404 chemically adsorbs to the microparticles 1409. Because this reaction is the one between liquids (liquid-liquid reaction), the colorant 1404 is considered to adsorb to the surfaces of the microparticles 1409 uniformly in a single-molecular state (FIG. 3C). That is, on the surfaces of the microparticles, the colorant is considered to not agglomerate or, if it does, in a very small degree. Thus, a large number of microparticles adsorbing the colorant 1404 in a single-molecular state are formed on a surface of the reaction portion 1401, leaving the colorant in a single-molecular state on the surface layer that most affects the color characteristic. This allows for the formation of a printed image with high density and high color saturation.

Next, because their dispersion state becomes unstable, the microparticles adsorbing the colorant 1404 are considered to aggregate together (FIG. 3C). That is, the aggregates 1415 thus formed hold therein the colorant in a single-molecular state. With these aggregates 1415, a printed image with high density and high color saturation is formed.

Further, a part of unreacted colorant 1404 disperses in the liquid pool 1407, adsorbing to surfaces of unreacted microparticles 1409. Because the reaction between the colorant and the microparticles further proceeds in the liquid pool 1407, the density and color saturation of the image being formed further increase. The microparticle aggregates 1411 formed on the surfaces of print medium fibers, described earlier, are considered to have a role of restricting the soaking of the liquid of the pool 1407 into the print medium. This allows greater numbers of microparticles 1409 in the liquid compound, whose penetration was restricted, and of fine particles of colorant 1404 to mixedly coexist in the liquid pool 1407, increasing a probability of contact between the colorant 1404 and the microparticles 1409. This in turn ensures that the reaction proceeds relatively uniformly and well, forming an image with enhanced density and color saturation.

Further, when the liquid compound 1406 is applied to the print medium 1403 (FIG. 3A) or when the ink 1413 is applied to the liquid pool 1407 (FIG. 3B), a disperse medium in which the microparticles 1409 are dispersed changes, making the dispersion state of the microparticles 1409 unstable and causing some of the microparticles 1409 to aggregate together before the colorant 1404 adsorbs to them. The changes in the disperse medium refer to changes generally observed when two or more different liquids mix together, such as physical changes in pH of a liquid phase, a solid concentration, a composition of solvent and a dissolved ion concentration. When the liquid compound comes into contact with a print medium or ink, these changes are considered to occur rapidly in combination, destroying the dispersion stability of the microparticles and producing aggregates. These aggregates are considered to have an effect of filling voids between fibers and an effect of causing microparticles adsorbed with colorant to remain near the surface of the print medium. Further, of the aggregates formed in the liquid pool 1407, some are adsorbed to the print medium and some are able to move in the liquid (have a fluidity). As to the aggregates with a fluidity, the colorant adsorbs to the surfaces of these microparticle aggregates forming even greater aggregates, as in the reaction process between the colorant and the microparticles. These increased-size aggregates contribute to an improvement of the color characteristics. As the liquid phase penetrates along the fibers, it is assumed that the increased-size aggregates moves with the liquid phase, filling voids to smooth the surface of the print medium, contributing to the formation of an image with less variations and higher density.

As described above, the use of the ink processing liquid causes the colorant to adsorb to the microparticles or microparticle aggregates in a single-molecular state and remain near the surface of a print medium, resulting in an image with high color saturation. Further, since the microparticles, which adsorbed the colorant in a single-molecular state and which remained near the surface of a print medium, fix to the surface of the print medium, the image thus formed has an enhanced fastness such as enhanced rubbing and water resistances.

Figure 3D:
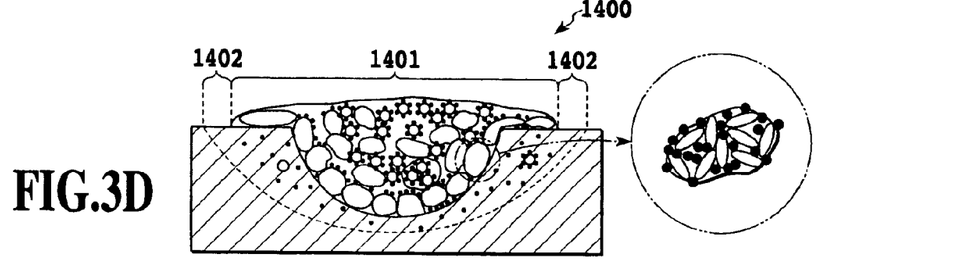
FIG. 3D is a schematic cross-sectional view of a print medium applied with ink droplets and a print performance enhancement liquid.

While a print medium has been described to be applied first with a liquid compound followed by an ink, the order of application of the ink and liquid compound is not limited to this case as long as a liquid-liquid reaction between the ink and the liquid compound is realized. For example, the ink may be applied first, followed by the liquid compound. Further, as shown in FIG. 3B, at least a part of the microparticles in the liquid compound applied to the print medium is considered to have penetrated into the print medium along with the liquid medium. Meanwhile, it is also likely, as shown in FIG. 3D, that the colorant adsorbs or binds in a single-molecular state to already-infiltrated microparticles. These microparticles that adsorb or bind the colorant in a single-molecular state in the interior of the print medium are also considered to contribute to improving the color characteristics. Further, the penetration of the liquid medium is also considered to improve the ink fixing performance.

The use of the liquid compound of this embodiment causes voids of some size to be formed within microparticle aggregates 1411 when the aggregates 1411 are formed near the surface of the print medium. Some of the fine particles of colorant 1404 that failed to adsorb to the microparticles 1409 in the liquid pool 1407 pass through the voids along with a solvent component and move into the microparticle aggregates 1411 as they penetrate into the print medium. In this process, the colorant 1305 adheres to and around inlets and inner walls of voids within the microparticle aggregates, with only the solvent component penetrating into the print medium, with the result that an increased volume of colorant can efficiently adsorb to the surfaces and interiors of the aggregates 1411 and therefore remain near the surface of the print medium. Further, where the colorant 1404 is a dye, since the diameter of the voids in the aggregates 1411 is about one to several times the size of molecules present in the ink of the colorant 1404, the fine particles of the colorant 1404 adsorbing to the inside of the voids hardly agglomerate together, retaining an ideal single-molecular state. This in turn makes a great contribution to the improvement of the color characteristic, realizing a print with an even wider color reproduction range.

Further, since in this invention the microparticles and the colorant are made to react with each other in a liquid phase on the surface of the print medium, when the colorant is anionic, the colorant can adsorb to the surfaces of the cationic microparticles very efficiently.

Further, as described in the conventional art explanation, if the same level of colorant adsorption as that of this invention is to be realized with coated paper for ink jet printing, a large amount of cationic porous microparticles is required and such a thick ink reception layer as will cover and hide the base paper needs to be formed. Hence, the use of coated paper can mar the texture of the base paper. Because the amount of microparticles making up the liquid compound of this invention can be set small, an image can be formed which has no marked difference in formed which has no marked difference in texture between a printed portion and an unprinted portion, without spoiling the texture of the print medium.

In the case of a method that mixes a volatile solvent or penetrating solvent in ink, the amount of colorant itself remaining on the surface of the print medium may not be enough. If the amount of colorant remaining on the surface of the print medium is sufficient, the present invention does not let fine particles of the colorant aggregate—as they do in the method that causes a reaction of the liquid compound on the print medium—and can leave on the surface of the print medium the colorant in a single-molecular state along with the microparticles to whose surfaces the colorant is adsorbed. As a result, an image produced can have an enhanced level of color saturation.

The ink processing liquid of this embodiment may seem similar at a glance to the conventional technique cited as the third method, which adds a microparticle-containing liquid compound to ink, in that an image is formed by applying the microparticle-containing liquid compound and the ink to the surface of a print medium. It should be noted, however, that the present invention positively causes the liquid compound to react with the colorant and uses the microparticles in the liquid compound as a means for suppressing aggregation of the colorant, whereas the conventional technique uses the application of the microparticle-containing solution as a means to improve the surface state of the print medium and does not disclose at all an idea of causing a chemical reaction between the microparticles charged to one polarity and the colorant in the ink charged to the opposite polarity. A quality difference between a print obtained by the conventional printing techniques and a print produced by the present invention, considered due to the above-described difference between their mechanisms, is clearly distinguishable.

Next, a method of generating ejection data for the ink processing liquid and the ink will be described in detail.

Figure 4:
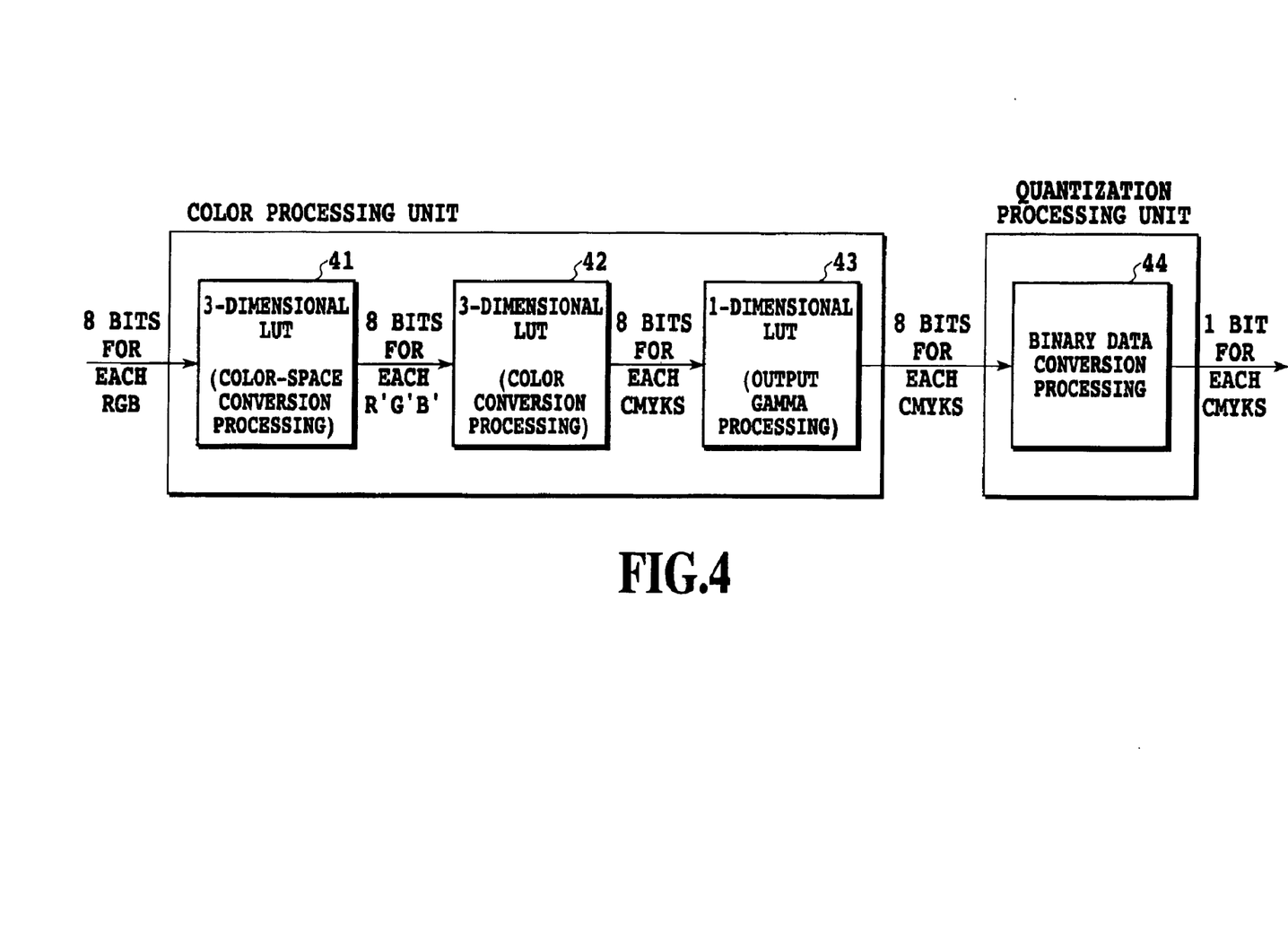
FIG. 4 is a block diagram showing image processing (color processing) in this embodiment.

FIG. 4 is a block diagram showing image processing (color processing) in this embodiment. Now, a processing flow for producing color data or ejection data for each of C, M, Y, K color inks and ejection data for the ink processing liquid S (or processing liquid S) from 8-bit (256 gray scale values) image data or luminance data for each of R, G, B colors will be explained.

The 8-bit data for R, G, B colors are converted into 8-bit data for R', G', B' colors by a three-dimensional lookup table (LUT) 41. This processing is called color space conversion processing (color prestage processing) and designed to correct differences between a color space of an input image and a reproduced color space of an output device. This conversion uses a three-dimensional LUT. The LUT has discrete data for input 8-bit gray scale values, and those values between the available discrete data are determined by interpolation. There are a variety of interpolation methods available. In this embodiment a tetrahedron interpolation method disclosed in Japanese Patent Application Publication No. 58-16180 is used. Other interpolation methods may also be used.

The R', G', B' 8-bit data that have undergone the color space conversion processing are then converted by a three-dimensional LUT 42 into 8-bit data for each C, M, Y, K ink color and 8-bit data for the processing liquid S. That is, in this processing not only is the input RGB color luminance data converted by the ordinary color conversion processing (luminance-density conversion processing) into output CMYK density data, but processing liquid S data is also produced.

Since there is a limit on the amount of water in ink that can be received in a print medium, this color conversion processing considers the volume of ink applied to a print medium in determining the density data for each ink color and the processing liquid S data. That is, performing the color conversion processing using this LUT can generate the ink density data and the processing liquid data that help reduce the ink application volume, without performing a great deal of computations.

If a macroscopic water accommodation capacity in a predetermined area of a print medium is 300%, for example, then three to four dots can be applied to each pixel. The word "macroscopic" is used because, if a certain pixel is applied four dots, applying fewer dots to the surrounding pixels can result in the applied ink being received well by the print medium as a whole.

To determine the volumes of ink and processing liquid in the macroscopic reception range of 300%, the LUT 42 of this embodiment produces a combination of CMYK density data and processing liquid S data such that a total of gray scale values of the color-converted CMYK density data and the processing liquid S data is within 768 (=256*3).

For example, for each of 729 lattice points obtained by dividing each axis of the space defined by the R', G', B' 8-bit data, patches based on a plurality of combinations of (C, M, Y, K, S) that satisfy the above-described total gray scale value requirement are printed, and colors of the printed patches are measured to obtain L*a*b* space values. Then, a (C, M, Y, K, S) combination nearest to a L*a*b* space value represented by the original input data (R', G', B') is determined to produce lattice point data. These lattice point data are used as the content of the LUT 42.

The conversion from (R', G', B') into (D, M, Y, K, S) performed by the color conversion processing of this embodiment includes the processing liquid S data. Adding the processing liquid S data enhances the fixing performance of ink and thereby improves the actual color characteristics when compared with those not using the processing liquid, making it also possible to widen the color reproduction range.

In this way, based on the R', G', B' data, the color conversion processing 42 generates 8-bit C, M, Y, K multivalued data (density data) and processing liquid S multivalued data. These multivalued density data for each color ink and the multivalued processing liquid S data are subjected to output gamma processing 43.

Next, since the color printing apparatus of this embodiment is a binary printing device, the 8-bit data for C, M, Y, K and S is quantized by a quantization processing unit 44 into 1-bit data (binary data) for C, M, Y, K and S. In this embodiment, the quantization is performed using an error spreading method. The quantization processing using the error spreading method is a known technique and is made public in a variety of literatures and papers, including "Nikkei Electronics, May Issue, 1978, page 50–65," and therefore detailed explanations are omitted here.

The error spreading method generally sets a threshold at an intermediate gray scale value (127/255). If this threshold should change, the total number of dots applied to a predetermined area remains the same with only the arrangement of the dots changed. So, it is needless to say that the threshold may take any desired value. Further, since the dot arrangement determined by the error spreading processing is evenly distributed, when seen macroscopically, according to the gray scale value, the dot arrangement of the processing liquid S determined by the same error spreading processing also depends on the gray scale value.

As described above, image data sent from the host is converted by the LUT into the C, M, Y, K multivalued data and the processing liquid S multivalued data and then quantized by the quantization processing unit into binary data for each color ink and binary data for the processing liquid. According to these binary data, the print head is driven to eject inks and a processing liquid to form an image.

Here, a method of generating the S data in the LUT will be described in detail. It should be noted that the following explanation is given only as an example and not intended to limit the invention in any way.

For a value (R, G, B) of a lattice point in the three-dimensional LUT, a gray level for each colorant is assumed to be C(R, G, B), M(R, G, B), Y(R, G, B) and K(R, G, B) and a total gray level of these color components to be o(R, G, B). That is, $$o(R, G, B) = C(R, G, B) + M(R, G, B) + Y(R, G, B) + K(R, G, B)$$

Let A % stand for an application rate of processing liquid which, after the fixing of these ink colorants in medium and high gray scale regions, produces a satisfactory result in terms of density and color saturation (also referred to as a "basic processing liquid application rate"), then an appropriate volume of processing liquid (also referred to as a "basic processing liquid application volume") S0(R, G, B) is given by $$S0(R, G, B) = o(R, G, B) \times A\% \text{ (where } A \text{ is an arbitrary fixed value, e.g., 50\%).}$$

However, there is a limit on the amount of water that can be accommodated by a print medium and, as described earlier, the total application volume is set at 300% or less in this embodiment.

Thus, an actual value of the processing liquid S, S(R, G, B), in the LUT uses the basic processing liquid application volume S0 when a condition (1) S0(R, G, B)+o(R, G, B)≦300% is satisfied. That is, $$S(R, G, B) = S0(R, G, B).$$

When on the other hand the condition (1) is not satisfied, the sum of the ink application volume and the processing liquid S application volume is set to 300%.
That is $$S(R, G, B) = 300\% - o(R, G, B).$$

Under the above condition, it is possible to determine a processing liquid application volume that satisfies the maximum application volume and at the same time produces a satisfactory result in terms of density and color saturation of an image formed.

As described above, in medium and high gray scale regions in a unit area of a predetermined size, determining the processing liquid application volume using the above method can optimize the application volumes of the processing liquid and color inks. However, the method of determining the processing liquid ejection data according to this embodiment does not determine the processing liquid ejection data for the conventional ink ejection data (binary data). Hence, in low gray scale regions with only sparsely distributed ink dots, the processing liquid is applied to ink dots or in their vicinity, so the processing liquid does not necessarily react with the ink. To deal with this problem, it is an effective control to set A' %(e.g. 75%), a value larger than A % (50%), as the basic processing liquid application rate in low gray scale regions to increase a probability of contact between the processing liquid and the color inks.

More specifically, if the total gray level of color components o(R, G, B) is less than a predetermined value P(e.g. 50%), a region concerned is taken as a low gray scale region and the basic processing liquid application rate is set to A'% to calculate the basic processing liquid application volume S0(R, G, B).

$$S0(R, G, B) = o(R, G, B) \times A'\,\%$$

Based on this basic processing liquid application volume S0(R, G, B), the actual application volume S(R, G, B) of the processing liquid is determined using the above method.

Although only two the basic processing liquid application rates are used here, A'% for low gray scale regions and A% for medium and high gray scale regions, more finely differentiated application rates may be set in the LUT.

With the above arrangement made, a ratio of the processing liquid application volume to the total ink application volume will be relatively high in low gray scale regions and relatively low in high gray scale regions.

Using the conventional method of generating binary data for the processing liquid S from CMYK binary data, it is also technically possible to control the generation of the processing liquid S data such that the processing liquid application volume is set somewhat smaller than normal in regions applied with a relatively large volume of CMYK inks and somewhat larger than normal in regions with a relatively small volume of CMYK inks. With such a conventional means, however, since the processing liquid application data is generated after the actual print data has been generated and immediately before the printing is executed, the addition of the above-described fine adjustment results in a complicated operation circuit and an increased cost.

Further, in ordinary printing apparatus that produce a full-color (16.7 million colors) image from CMYK binary data, 16.7 million colors are generated not in each printed pixel but in an area made up of a plurality of pixels. Thus, determining the ejection/non-ejection of processing liquid S data for each pixel cannot produce a desired effect on the image as a whole. Then, if, to obtain such an effect, the generation of the processing liquid S data for a pixel of interest is determined by considering a frequency of occurrence of CMYK binary data dot in a predetermined area, not only does this make the operation circuit even more complex but a volume of data to be processed increases prohibitively large, resulting in a significant load increase. Further, if a frequency of generation of the processing liquid data has a randomness, the management of actual color characteristics also becomes difficult. These conventional methods therefore may cause image impairments.

With this embodiment, on the other hand, the color reproduction control for each unit area in a full-color image, like the one described above, can control a relation between the processing liquid and the color in that area by simply changing a value of LUT. Based on RGB data for a predetermined area, the gray scale and color of that area are checked and a basic processing liquid application rate according to the gray scale and color is set in the table. This makes it possible to generate appropriate actual ejection data for the processing liquid S simply by executing the similar sequence of operations to that used for ink. Further, by adjusting the basic processing liquid application rate A (%), an appropriate volume of processing liquid can be applied at all times according to the ink application volume, thereby preventing the processing liquid from being consumed more than necessary.

Further, in conventional techniques, the processing liquid S data is determined by logic operations from quantized binary CMYK data. With this invention, the multivalued data of processing liquid S is generated from multivalued RGB data before being quantized, so that the load of processing is smaller than in the logic operation method. Thus, the method of this invention is advantageously applied to printers that are demanded of fast printing speed.

As described above, in this embodiment since processing liquid multivalued data is generated during the color conversion processing, the processing liquid application rate can be controlled easily to match a color range and individual ink application rates. At the same time, this embodiment allows for an easy control of the combined volume of ink and processing liquid to be applied to a print medium and thus can provide an ink jet printing apparatus with a reduced limitation on the degree of freedom of image processing.

We have described the mapping of LUT data for the four CMYK color inks and the processing liquid S. Recent years, however, have seen an increasing use of 6-color printing apparatus that use low-density light-colored inks in addition to the basic four colors. In the following, the LUT data mapping in the 6-color configuration using additional light-colored inks will be explained.

In the case of general dark-light ink printing using PC and PM in addition to the CMYK inks, it is assumed that, for each lattice point (R, G, B) that has seven values for C, M, Y, K, PC, PM and S, the three-dimensional LUT described above has gray scale values C(R, G, B), M(R, G, B), Y(R, G, B), K(R, G, B), PC(R, G, B) and PM(R, G, B) for the six colors. Let a processing liquid application rate that produces a satisfactory result for dark color inks (C, M, Y, K) be A % (for example, 50%). Let a processing liquid application rate that produces a satisfactory result for light color inks (PC, PM) be B % (for example, 17%). Since the light-colored inks (PC, PM) contain a smaller amount of colorants, the value of B is generally smaller than A. That is, because the processing liquid reacts with colorants, the inks with a smaller amount of colorants can produce an intended effect if the volume of processing liquid is small. Thus, controlling the processing liquid application rate according to the applied volume of inks can minimize a total volume of processing liquid consumed. This is a great advantage for a configuration that applies the processing liquid in an on-demand printing scheme as used in an ink jet system.

The processing liquid application volume S(R, G, B) for a lattice point (R, G, B) of the three-dimensional LUT needs to be set to the following value:

$$S(R, G, B) = \{C(R, G, B) + M(R, G, B) + Y(R, G, B) + K(R, G, B)\} \times A\% + \{PC(R, G, B) + PM(R, G, B)\} \times B\%$$

As with the case of four CMYK colors, a limit of, for example, 300% may also be imposed on the combined total of the processing liquid application volume and the C, M, Y, K and PC, PM ink application volumes.

While the basic processing liquid application rate A is differentiated between the dark inks (C, M, Y, K) and the light inks (PC, PM), this invention is not limited to this arrangement. For example, six different basic application rates may be used one for each of the color inks. In either case, an appropriate value needs only to be set as the LUT value in advance and the processing following the LUT is similar to that performed in the four-color configuration.

Further, as in the case of the four-color configuration, it is possible to change the basic processing liquid application rates A, B (%) to larger values of A' (e.g., 75%) and B' (e.g., 50%) in low gray scale regions. It is needless to say that the basic processing liquid application rates A, B (%) are adjusted according to the gray level and color.

Meanwhile, in a conventional method of generating binary data for a processing liquid S from CMYK binary data or in a general thinning mask method that determines dot arrangements in, for example, a 3×3-pixel unit area, a desired ratio between the ink application volume and the processing liquid application volume in the unit area of interest can be maintained. However, when an error spreading method that cannot determine the dot arrangements is used as other general masking method, there is a possibility that the ratio between the ink and processing liquid application volumes may not be kept constant.

Further, in the method of generating the processing liquid binary data from the CMYK and PMPC binary data, for the processing liquid application rate to be changed according to whether dark or light ink dots are applied, the processing liquid application data for an area of interest needs to be generated in real time under complex conditions from binary data of each ink in that area. As a result, an increased volume of calculations prolongs a calculation time or requires a processor capable of performing calculations at higher speed, making the system costly. Further when a darklight ink printing method and an ejection volume modulation printing method are used simultaneously, setting an appropriate processing liquid application volume according to the volume of colorant by using known technologies leads to complex processing and therefore an increased cost.

However, with this invention, the above requirements can be met easily at all times by simply changing the value of basic processing liquid application rate in LUT, realizing an improved image formation at reduced cost.

As described above, compared with the conventional method of generating the processing liquid data based on quantized color ink binary data as by a printer, the processing liquid data generation method of this invention can easily generate the processing liquid data according to the dark-light ink printing or to the ejection volume modulation printing without unduly complicating the processing circuit, thereby providing low-cost, satisfactory printing to the user.

While the image processing has been described to be performed by the printer in this embodiment, the present invention is not limited to this configuration. For example, the image processing may be performed by a host computer connected to the printing apparatus. More specifically, the color conversion processing and the quantization processing are performed by the host computer. In other words, the conversion from the RGB data into the CMYK and S ejection data (binary data) may be performed in a way described above by a printer driver on the host computer, which may then send only the ink and processing liquid ejection data (binary data) to the printing apparatus.

Further, this invention can also be applied easily to a configuration that employs a 3- to 16-value quantization that has come to be performed in recent years to reduce the volume of data to be transferred between a host PC and a printer. In that case, it is obvious from known technologies and the present invention that the processing liquid data values in the LUT need to consider not only the output gamma corrected values described above but also the conversion that transforms the quantized multivalued data into an actual number of ink droplets. For example, in a 4-value printing, the quantized result is 0, 1, 2 and 3, but there is a case where the printer that has received these quantized data may change the number of ink droplets or dots to 0, 1, 2 and 4. In this case, in a quantized value range of between 0 and 2, the number of ink droplets applied also changes from 0 to 2 dots at the same rate, whereas at only the quantized value of 3 the number of ink droplets applied increases at a different rate. If the processing liquid application volume is calculated from the LUT table value of the color ink alone, the actual application volume will deviate. To prevent his deviation, where a ratio between the quantized values and the ink application volumes is not necessarily constant, some considerations need to be taken when generating the LUT. Further, in addition to the ink jet printing apparatus and the image processing method, the present invention also includes a program for executing the image processing method. The program includes all forms of program, such as those installed not only in the ink jet printing apparatus but also in other devices such as a host computer.

(Others)

Further, the present invention is particularly advantageously applied to a print head and a printing apparatus of a type that has a means for generating thermal energy (e.g., electrothermal transducers and laser light) to cause a status change in ink to eject ink droplets. In this printing system, the present invention can realize a higher density and resolution.

As described above, since the processing liquid application data and color ink density data are determined based on image data to be printed, not only does the processing liquid application rate match the color range but it also corresponds to the color ink application rate. That is, this invention provides a substantial improvement over the conventional techniques that are required to take into consideration a frequency of occurrence of dots in a wide region in determining the processing liquid application rate based on CMYK binary data.

Further, this invention enables an appropriate processing liquid application volume to be determined without imposing a limitation on the image processing, thereby maintaining a satisfactory image quality and providing a printed result with a high ink fixing performance. That is, in high gray scale regions, as in solid printed regions, where the water accommodation capacity of a print medium is almost filled by ink alone, the processing liquid application volume is relatively reduced while maintaining the original ink application volume, thus satisfying the limit on the print medium water accommodation capacity. In low and medium gray scale regions, the processing liquid application volume is increased comparatively to increase a probability of the processing liquid contacting sparsely distributed ink dots and thereby enhance the ink fixing performance. As a result, not only can the limitation on the ink application caused by the application of the processing liquid be minimized but also a variety of conditions can be dealt with by simply changing the LUT values. This makes a degree of freedom of the image processing not easily degradable and also leads to a substantial reduction of the image processing, thus preventing a deterioration in a printed image quality.

Furthermore, since the processing liquid application data is determined based on RGB data, it can be better matched to the associated gray scale and generated with a smaller processing load than in the conventional method which calculates the processing liquid application data from binary ejection data for each ink color.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An ink jet printing apparatus which uses a print head for ejecting a plurality of color inks and a print head for ejecting a processing liquid contributing to fixing the inks on a print medium to apply the inks and the processing liquid to the print medium to form an image, the ink jet printing apparatus comprising:

a color conversion processing means for generating multivalued data for each of the color inks and multivalued data for the processing liquid based on multivalued image data corresponding to an image to be printed; and a quantization processing means for converting the multivalued data for each of the color inks and the multivalued data for the processing liquid generated by the color conversion processing means into quantized data for each of the color inks and quantized data for the processing liquid.

2. An ink jet printing apparatus according to claim 1, wherein the multivalued image data is RGB luminance data.

3. An ink jet printing apparatus according to claim 1, wherein the quantization processing means converts the color ink multivalued data and the processing liquid multivalued data into binary data for each of the color inks and binary data for the processing liquid and which, based on the converted color ink binary data and the processing liquid binary data, drives the print heads to eject the inks and the processing liquid from the print heads.

4. An ink jet printing apparatus according to claim 1, wherein the color conversion processing means sets a rate of a processing liquid application volume with respect to a sum of color ink application volumes such that the rate of the processing liquid application volume in a relatively low gray scale region is higher than in other regions and that the rate of the processing liquid application volume in a relatively high gray scale region is lower than in other regions;

wherein the color conversion processing means generates processing liquid application data such that a total of the processing liquid application volume and the color ink application volumes is not in excess of a water accommodation capacity of the print medium.

5. An ink jet printing apparatus according to claim 1, wherein for two inks of the same color but with different ratios of a including colorant, the color conversion processing means generates processing liquid application data such that a rate of a processing liquid application volume for the ink having a relatively small content of colorant is smaller a rate of a processing liquid application volume for the ink having a relatively large content of colorant.

6. An ink jet printing apparatus according to claim 1, wherein the inks are anionic or cationic water-based inks containing colorants, the processing liquid is a water-based liquid compound containing disperse microparticles charged on their surface in a polarity opposite to that of the water-based inks.

7. An ink jet printing apparatus according to claim 6, wherein when the inks and the processing liquid are applied to the print medium, the colorants in the inks adsorb in a single-molecular state to surfaces of the microparticles in the processing liquid.

8. An ink jet printing apparatus according to claim 6, wherein the microparticles in the processing liquid are alumina or alumina hydrate.

9. An image processing method for processing data used in an ink jet printing apparatus, wherein the ink jet printing apparatus uses a print head for ejecting a plurality of color inks and a print head for ejecting a processing liquid contributing to fixing the inks on a print medium to apply the inks and the processing liquid to the print medium to form an image, the image processing method comprising:

a color conversion process for generating multivalued data for each of the color inks and multivalued data for the processing liquid based on multivalued image data corresponding to an image to be printed; and a quantization process for converting the multivalued data for each of the color inks and the multivalued data for the processing liquid generated by the color conversion process into quantized data for each of the color inks and quantized data for the processing liquid.

10. A control program for processing data used in an ink jet printing apparatus, wherein the ink jet printing apparatus uses a print head for ejecting a plurality of color inks and a print head for ejecting a processing liquid contributing to fixing the inks on a print medium to apply the inks and the processing liquid to the print medium to form an image, the control program comprising:

a process for generating multivalued data for each of the color inks and multivalued data for the processing liquid based on multivalued image data corresponding to an image to be printed; and a process for converting the multivalued data for the each of the color inks and the multivalued data for the processing liquid generated by the color conversion process into quantized data for each of the color inks and quantized data for the processing liquid;

wherein these process are executed by a computer.

* * * * *

UNITED STATES PATENT AND TRADEMARK OFFICE
CERTIFICATE OF CORRECTION

| | |
|---|---|
| PATENT NO. | : 6,893,114 B2 |
| APPLICATION NO. | : 10/609484 |
| DATED | : May 17, 2005 |
| INVENTOR(S) | : Kentaro Yano et al. |

It is certified that error appears in the above-identified patent and that said Letters Patent is hereby corrected as shown below:

COLUMN 5

Line 52, "ink" should read --inks--.

COLUMN 6

Line 1, "ink" should read --inks--.
Line 16, "ink" should read --inks--.
Line 20, "process" should read --processes--.

COLUMN 7

Line 35, "but" should read --and--, and "system" should read --systems--.

COLUMN 9

Line 36, "microparticles" should read --microparticles to--.
Line 40, "drop-lets" should read --droplets--.

COLUMN 10

Line 41, "moves" should read --move--.

UNITED STATES PATENT AND TRADEMARK OFFICE
CERTIFICATE OF CORRECTION

PATENT NO. : 6,893,114 B2
APPLICATION NO. : 10/609484
DATED : May 17, 2005
INVENTOR(S) : Kentaro Yano et al.

It is certified that error appears in the above-identified patent and that said Letters Patent is hereby corrected as shown below:

COLUMN 13

Line 30, "literatures" should read --literature--.
Line 59, "o(R," should read -- $\sigma$ (R,--.

Signed and Sealed this

Third Day of October, 2006

JON W. DUDAS
*Director of the United States Patent and Trademark Office*